United States Patent
Linger

(10) Patent No.: US 12,280,703 B2
(45) Date of Patent: Apr. 22, 2025

(54) INTERIOR AUTOMOBILE ACCESSORY THAT PREVENTS ITEMS FALLING OFF SEAT

(71) Applicant: Dakota Linger, Buckhannon, WV (US)

(72) Inventor: Dakota Linger, Buckhannon, WV (US)

( * ) Notice: Subject to any disclaimer, the term of this patent is extended or adjusted under 35 U.S.C. 154(b) by 87 days.

(21) Appl. No.: 18/117,202

(22) Filed: Mar. 3, 2023

(65) Prior Publication Data
US 2024/0042912 A1 Feb. 8, 2024

Related U.S. Application Data

(60) Provisional application No. 63/394,551, filed on Aug. 2, 2022.

(51) Int. Cl.
*B60N 3/08* (2006.01)
*B60N 2/90* (2018.01)
*B60R 7/04* (2006.01)

(52) U.S. Cl.
CPC ............ *B60N 3/08* (2013.01); *B60N 2/90* (2018.02); *B60R 7/04* (2013.01)

(58) Field of Classification Search
CPC .................... B60R 7/043; B60N 3/08
See application file for complete search history.

(56) References Cited

U.S. PATENT DOCUMENTS

| | | | | |
|---|---|---|---|---|
| 3,388,886 A * | 6/1968 | Tucker | | B60R 7/043 |
| | | | | 297/485 |
| 5,641,254 A * | 6/1997 | Sullivan | | B60N 2/90 |
| | | | | 24/130 |
| 7,415,932 B1 * | 8/2008 | Ngo | | B60N 3/103 |
| | | | | 108/4 |
| 9,718,388 B1 * | 8/2017 | Cressy | | B60N 3/08 |
| 10,486,606 B1 * | 11/2019 | Stabile | | B60R 7/08 |
| 12,024,129 B1 * | 7/2024 | Hsu | | B60R 7/043 |
| 2008/0264987 A1 * | 10/2008 | Sarro | | B60R 7/043 |
| | | | | 220/694 |
| 2010/0308604 A1 * | 12/2010 | Pauken | | F16B 45/028 |
| | | | | 292/169.14 |
| 2013/0193724 A1 * | 8/2013 | Gould | | A45C 15/00 |
| | | | | 297/188.2 |
| 2015/0230424 A1 * | 8/2015 | Hartelius | | B60R 22/10 |
| | | | | 248/505 |
| 2017/0008439 A1 * | 1/2017 | DiFiore | | B60R 11/00 |
| 2017/0088030 A1 * | 3/2017 | DeLeon | | B60N 3/103 |

(Continued)

FOREIGN PATENT DOCUMENTS

| | | | |
|---|---|---|---|
| DE | 102020117851 A1 * | 1/2022 | |
| FR | 3021917 A1 * | 12/2015 | ........... B60N 2/6009 |

(Continued)

*Primary Examiner* — Timothy J Brindley
(74) *Attorney, Agent, or Firm* — The Iwashko Law Firm, PLLC; Lev Ivan Gabriel Iwashko

(57) ABSTRACT

An interior automobile accessory, including a removable guard removably connected to a seat of an automobile to prevent items from falling off the seat, a plurality of cylinder prongs angularly disposed away from the removable guard with respect to a direction, an anchored base removably connected to the seat to receive the plurality of cylinder prongs therein, and a plurality of straps removably connected to the anchored base and extending from the anchored base a crevice between a seat base and a back rest to fasten the anchored base to the seat.

7 Claims, 6 Drawing Sheets

(56) References Cited

U.S. PATENT DOCUMENTS

| | | | | |
|---|---|---|---|---|
| 2017/0297499 | A1* | 10/2017 | Darrow | A45C 13/02 |
| 2018/0118124 | A1* | 5/2018 | Leverett | B60R 7/14 |
| 2018/0134225 | A1* | 5/2018 | Huebner | B60R 7/043 |
| 2019/0217784 | A1* | 7/2019 | Vanderpool | B60R 7/043 |
| 2019/0322221 | A1* | 10/2019 | Stephens | B60R 7/043 |
| 2019/0380299 | A1* | 12/2019 | Shewfelt | B60R 22/10 |
| 2021/0155163 | A1* | 5/2021 | Gandolfo | B60R 7/043 |
| 2021/0402905 | A1* | 12/2021 | Bruni | B60R 7/043 |

FOREIGN PATENT DOCUMENTS

| | | | | |
|---|---|---|---|---|
| GB | 2490558 A | * | 11/2012 | B60R 7/043 |
| KR | 19980048668 U | * | 9/1998 | |
| KR | 200462993 Y1 | * | 10/2012 | |
| KR | 20230128628 A | * | 9/2023 | |

* cited by examiner

INTERIOR AUTOMOBILE ACCESSORY THAT PREVENTS ITEMS FALLING OFF SEAT

CROSS-REFERENCE TO RELATED APPLICATIONS

This application claims priority under 35 USC § 120 from U.S. Provisional Application No. 63/394,551, entitled "Interior automobile accessory that prevents items falling off seat," which was filed on Aug. 2, 2022, in the United States Patent and Trademark Office, the disclosure of which is incorporated herein in its entirety by reference.

BACKGROUND

1. Field

The present general inventive concept relates generally to an interior automobile accessory that prevents items falling off seat.

2. Description of the Related Art

Currently, there are a number of solutions for interior automotive accessories that keep items organized and from sliding around. Some of these solutions attempt to organize items in a cube that sits on the seat base to prevent items from being tossed or lost. This solution fails the industry because there are many items that the consumer may want to transport that may be too large for a cube storage or organizer options including, but not limited to a takeout pizza box, a large cooking dish, and a large backpack. Other solutions attempt to provide an easy installation and removal process, but these solutions fail the industry because when the seat is needed to be used for a passenger, the consumer must remove the bulky organizational bin or organizer and their prospective accessories in its entirety for the passengers to sit comfortably. Still, other solutions seek to meet the aesthetic needs of consumers, but often are lacking in appeal customizable design options for the industry.

Therefore, there is a need for an interior automobile accessory that prevents items falling off seat.

SUMMARY

The present general inventive concept provides an interior automobile accessory that prevents items falling off seat.

Additional features and utilities of the present general inventive concept will be set forth in part in the description which follows and, in part, will be obvious from the description, or may be learned by practice of the general inventive concept.

It would be desirable to have an interior automobile accessory that protects items placed on the seat base from falling into the floor. Furthermore, it would be desirable to have an interior automobile accessory that has a part that is easily removable when not in use. Still, further, it would also be desirable to have an interior automobile accessory that can accommodate larger items that do not fit into an organization bin or cube. Moreover, it would be desirable that an automobile accessory would have a removable cloth cover for easy washing, or to be replaced with an additional cover that would fit the aesthetic preferences of the owner. This disclosed device advantageously fills these needs and addresses the aforementioned deficiencies by providing a means to prevent items from falling off the seat base onto the floor of the automobile.

Disclosed is an interior automobile accessory that prevents items falling off the seat, which is made up of the following components: (1) three straps that run parallel along the seat base, (2) an anchored base that goes to the front edge of the seat base, (3) a removable guard. These components are connected as follows: the straps fasten the anchored base to the automobile seat, and the anchored base serves to attach the removable guard into place to serve its purpose of keeping items in the seat.

The device may also have one or more of the following: (1) guard covers with an array of designs such as but not limited to different color options, material, and additional pockets for organization of smaller items; (2) additional removable guard frames that are of various shapes, sizes, and may be adjustable to meet the needs of the owner; (3) additional accessories that may replace the guard frame and attach to the anchored base. These accessories may include but are not limited to a removable container that may hold various items such as unwanted waste; and (4) the anchored base and the removable guard may be made out of a variety of material including but not limited to various types and forms of plastics, metals, and woods.

The disclosed device is unique when compared with other known devices and solutions because it provides: (1) once the device is installed, only the guard needs removed to accommodate a passenger; (2) the device can accommodate both big and small items; (3) the device's removable cover can be customized to meet the desired aesthetics for the customer; (4) the device has interchangeable accessories that can be purchased separately; and (5) and the product is light in weight, not bulky, and made of durable material.

The disclosed device is unique in that it is structurally different from other known devices or solutions. More specifically, the device is unique due to the presence of the removable guard that can (1) be removed with ease when needed and does not require the disassembly of the whole device; (2) can be interchanged with other accessories that accommodate the needs of the consumer; and (3) allows for the utilization of the whole seat base for large items or a large quantity of items.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Interior automobile accessory that prevents items falling off seat may, however, be embodied in many different forms and should not be construed as being limited to the embodiments set forth herein; rather, these embodiments are provided by way of illustration only and so that this disclosure will be thorough, complete and fully convey understanding to those skilled in the art.

The foregoing and/or other features and utilities of the present general inventive concept may be achieved by providing an interior automobile accessory, including a removable guard removably connected to a seat of an automobile to prevent items from falling off the seat, a plurality of cylinder prongs angularly disposed away from the removable guard with respect to a direction, an anchored base removably connected to the seat to receive the plurality of cylinder prongs therein, and a plurality of straps removably connected to the anchored base and extending from the anchored base a crevice between a seat base and a back rest to fasten the anchored base to the seat.

The anchored base may include a plate removably connected to the seat base, a plurality of cylinder tubes disposed on at least a portion of the plate to receive the plurality of cylinder prongs therein, and a plurality of designated slots disposed on at least a portion of the plate to receive the plurality of straps therein.

One of the plurality of straps may be fastened to the seat different from at least one second of the plurality of straps is fastened to the seat.

The interior automobile accessory may further include an adjustable buckle comprising a plastic circular piece disposed at an end of one of the plurality of straps to create tension and prevent at least one of rotating and tilting of the anchored base.

The adjustable buckle may be disposed on a middle strap between a first strap and a second strap of the plurality of straps.

The interior automobile accessory may further include a plurality of fastening devices disposed at an end of each of the plurality of straps to fasten the removable guard and the anchored base to the seat by connecting a first end of each of the plurality of straps to a second end of each of the plurality of straps.

A first end of each of the plurality of straps disposed on a top side of the seat base may connect to a second end of each of the plurality of straps disposed on a bottom side of the seat base.

The interior automobile accessory may further include a waste bin removably connected to the anchored base to replace the removable guard.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
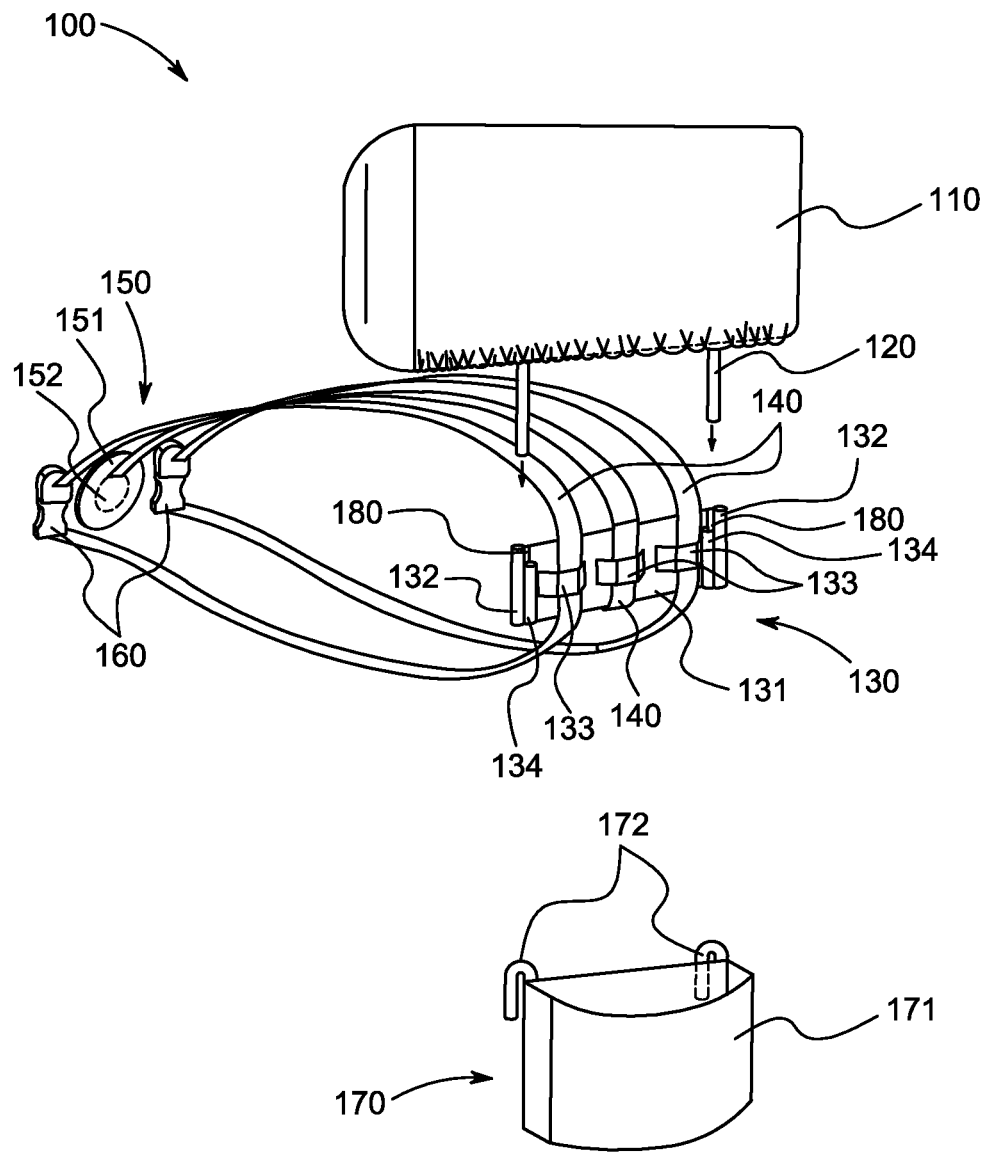
FIG. 1 illustrates an angled front view of an interior automobile accessory that keeps items from falling off a seat, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Interior Automobile Accessory 100
Removable Guard 110
Cylinder Prongs 120
Anchored Base 130
Plate 131
Cylinder Tubes 132
Designated Slots 133
Container Receiving Tubes 134
Straps 140
Adjustable Buckle 150
Circular Plastic Piece 151
Tensioning Snap 152
Fastening Devices 160
Waste Bin 170
Bin Body 171

Connector Rods 172
Removable Cover 180

FIG. 1 illustrates an angled front view of an interior automobile accessory 100 that keeps items from falling off a seat 10, according to an exemplary embodiment of the present general inventive concept.

Figure 2:
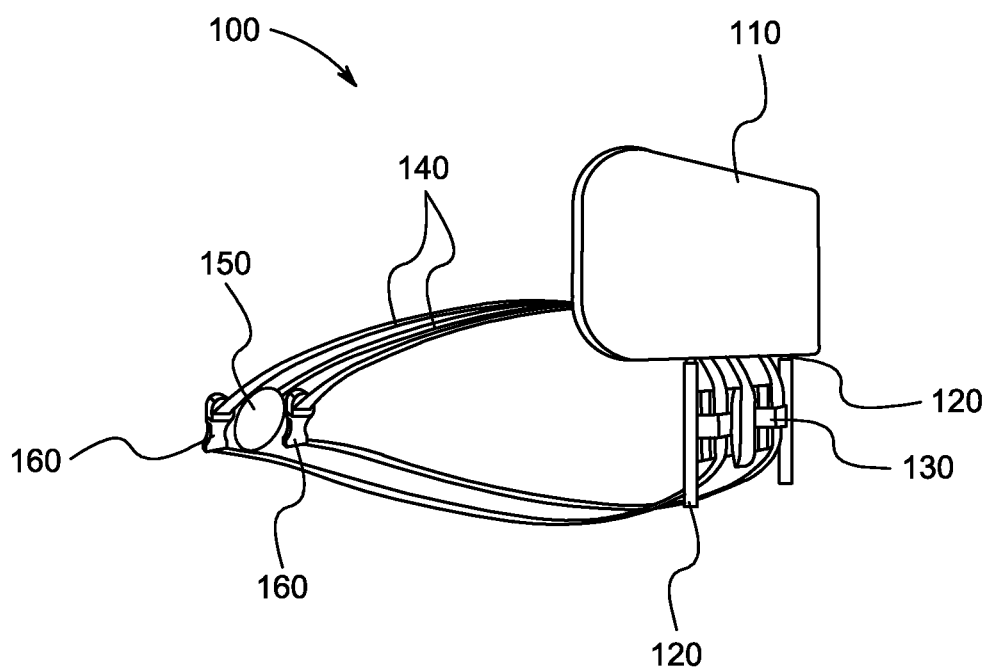
FIG. 2 illustrates a side, angled view of the interior automobile accessory with a removable guard detached from an anchored base, according to an exemplary embodiment of the present general inventive concept.

FIG. 2 illustrates a side, angled view of the interior automobile accessory 100 with a removable guard 110 detached from an anchored base 130, according to an exemplary embodiment of the present general inventive concept.

Figure 3:
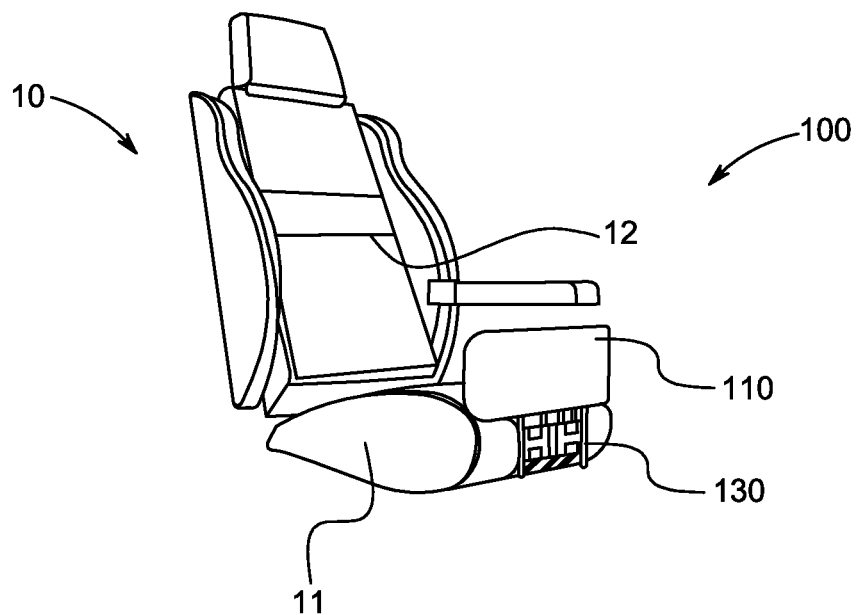
FIG. 3 illustrates an angled front view of the interior automobile accessory fully assembled on the seat, according to an exemplary embodiment of the present general inventive concept.

FIG. 3 illustrates an angled front view of the interior automobile accessory 100 fully assembled on the seat 10, according to an exemplary embodiment of the present general inventive concept.

The interior automobile accessory 100 may include a removable guard 110, a plurality of cylinder prongs 120, an anchored base 130, a plurality of straps 140, an adjustable buckle 150, a plurality of fastening devices 160, a waste bin 170, and a removable cover 180, but is not limited thereto.

The present invention is directed to the interior automobile accessory 100 that prevents items falling off a seat 10.

The anchored base 130 may include a plate 131, a plurality of cylinder tubes 132, a plurality of designated slots 133, and a plurality of container receiving tubes 134, but is not limited thereto.

In its most complete version, the interior automobile accessory 100 may be made up of the following components: (1) the plurality of straps 140 that run parallel with a seat base 11 of a seat 10. However, a first strap (i.e., the left) and a second strap (i.e., right) of the plurality of straps 140 may run across a top of the automobile's seat base 11, to a plurality of designated slots 133 on an anchored base 130, and under the seat base 11 to fasten in the back where the seat base 11 and back support 12 meet while a third strap (i.e., the middle) of the plurality of straps 140 only runs from the anchored base 130 to the crevice where the seat base 11 and back support 12 meet; (2) a circular plastic piece 151 located on the middle strap helps hold the middle strap in place when the clip is tightened and pressed against the crevice of the back of the seat base 11 and back support 12 creating tension and preventing the rotation and/or tilting of the anchored base 130; (3) a rectangular base, anchored via with the plurality of straps 140 (e.g., three) and their respective clips, with at least one of the plurality of cylinder tubes 132 on the left and right sides provide a means for the removable guard 110 to attach or detach from the anchored base 130; (4) a solid, rectangular removable guard 110, with at least one of the plurality of cylinder prongs 120 located on the bottom left and right sides of the removable guard 110 for attachment to the anchored base 130, prevents items from slipping into the floor of the automotive; (5) a customized, removable cover 180 that meets the needs of the buyer. In other words, the plurality of cylinder prongs 120 may be angularly disposed away from the removable guard 110 with respect to a direction. It should be further noted that: additional covers with various design elements and additional accessories that could slide into the anchored base 130 in the stead of the removable guard 110 could be purchased separately to meet the practical and aesthetic needs of the consumer.

FIG. 1 is an angled front view of the interior automobile accessory 100 as a whole when it is not attached to the seat base 11. It is important to note that the removable guard 110 with the removable cover 180, may be removed from the anchored base 130 to expose the plurality of cylinder prongs 120 which slide in and out of the anchored base 130 allowing the removable guard 110 to be attached while in use and removed when not. Each of the plurality of straps 140 and their respective fastening device of the plurality of fastening devices 160 may be the means by which the anchored base 130 and the removable guard 110 can be attached to the seat 10 of an automobile. The third (i.e., middle) strap of the plurality of straps 140 may run from a middle of the anchored base 130, across a top of the seat base 11 through the crevice of the back rest 12 and connects to the circular plastic piece 151. The first strap and the second strap of the plurality of straps 140 may also run parallel over the top of the seat base 11, but they run down through the plurality of designated slots 133 on the anchored base 130, under the seat base 11, and back around to fasten behind the seat 10 with the plurality of fastening devices 160.

The waste bin 170 may include a bin body 171 and a plurality of connector rods 172, but is not limited thereto.

FIG. 2 is an angled side view of the interior automobile accessory 100 fully assembled without being attached to a seat base 11. The removable guard 110 may have the removable cover 180 placed on it, and the plurality of cylinder prongs 120 are slid into place within the plurality of cylinder tubes 132 of the anchored base 130. Although it is not pictured, the removable guard 110 may be made into a variety of shapes, sizes, and adjustable designs to meet the needs of the consumer. Furthermore, other optional removable accessories such as but not limited to a waste bin 170 with the bin body 171 may replace the removable guard 110 and attach via the plurality of connector rods 172 that would fit into the plurality of container receiving tubes 134 of the anchored base 130. Although it is not pictured here, the cloth cover over the removable guard 110 may be made into a variety of shapes, colors, designs, and may include pockets to organize smaller items. The cover may also be removed for easy replacement and/or washing.

FIG. 3 is an angled front view of the interior automobile accessory 100 fully assembled and attached to an automobile seat 10. The interior automobile accessory 100 may be installed by running the respective strap of the plurality of straps 140 from the anchored base 130, along the seat base 11 to the back where the seat base 11 and back rest 12 meet. Although not pictured, the plurality of straps 140 may run through the crevice created by the seat base 11 and back rest 12 to fasten there. The removable guard 110 may be placed into the anchored base 110 to prevent items from sliding off the seat 10 into the floor of the automotive.

Therefore, the plate 131 may be removably connected on the seat base 11. Each of the plurality of cylinder tubes 132 may receive at least one of the plurality of cylinder prongs 120 therein.

Figure 4:
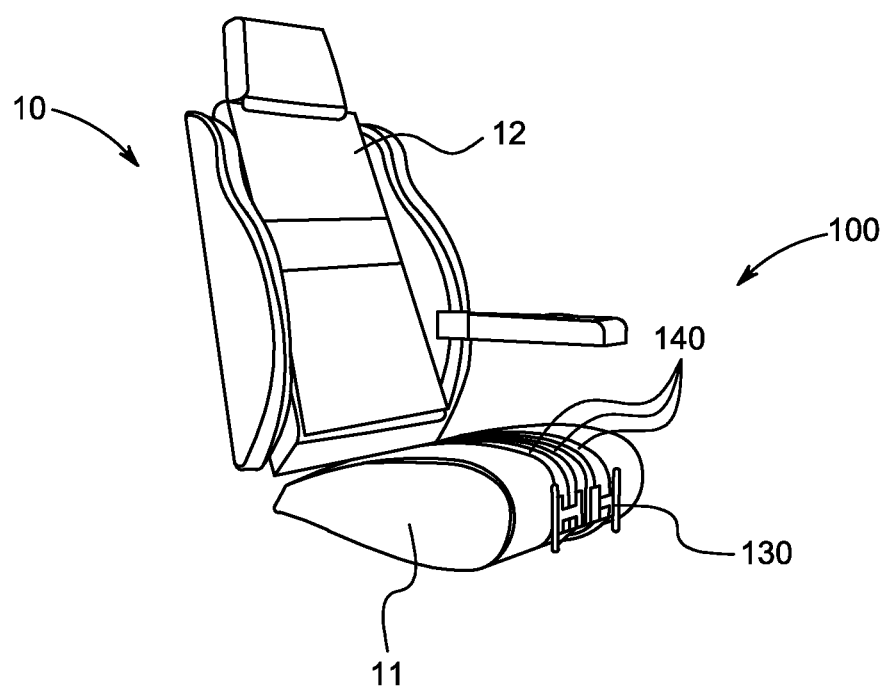
FIG. 4 illustrates an angled front view of the interior automobile accessory assembled without the removable guard, according to an exemplary embodiment of the present general inventive concept.

FIG. 4 illustrates an angled front view of the interior automobile accessory 100 assembled without the removable guard 110, according to an exemplary embodiment of the present general inventive concept.

FIG. 4 is a frontal, angled view of the interior automobile accessory 100 assembled without the removable guard 110. When the removable guard 110 may be designed to be removable to allow access to the seat base 11 without removing the whole interior automobile accessory 100. The anchored base 130 may sit along the front, lower edge of the seat base 11 so that it may not interfere with a passenger's comfort and/or ability to sit in the seat 10 when needed.

Figure 5:
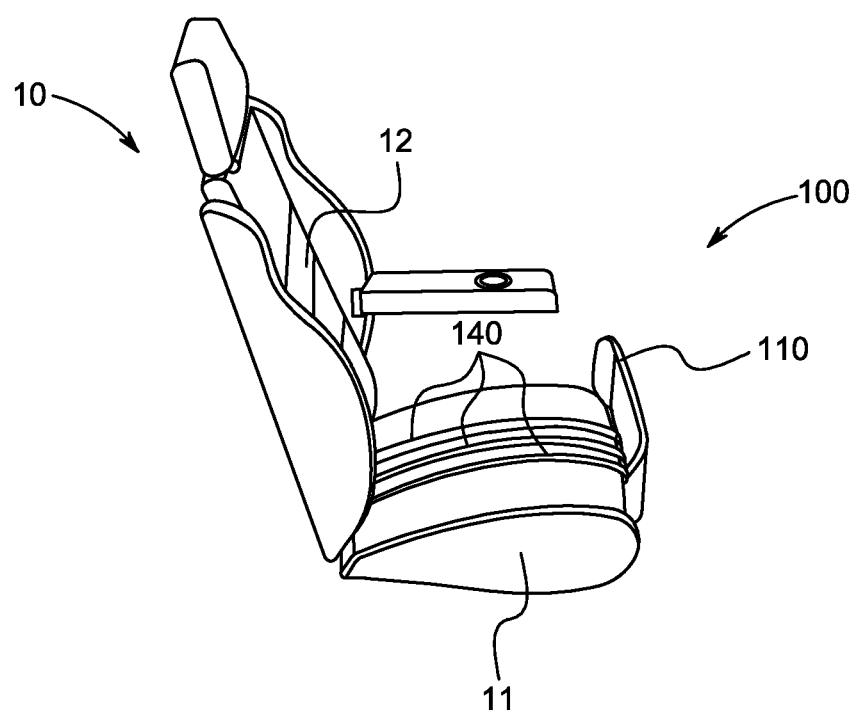
FIG. 5 illustrates a side, downward angle of the interior automobile accessory fully assembled on the seat, according to an exemplary embodiment of the present general inventive concept.

FIG. 5 illustrates a side, downward angle of the interior automobile accessory 100 fully assembled on the seat 10, according to an exemplary embodiment of the present general inventive concept.

FIG. 5 is a side view at a downward angle of the interior automobile accessory 100 fully installed. The middle strap of the plurality of straps 140 and the first strap (i.e., left) and the right strap of the plurality of straps 140 may run parallel from the anchored base 130 and the removable guard 110 as attached to where the backrest 12 and the seat base 11 meet.

Figure 6:
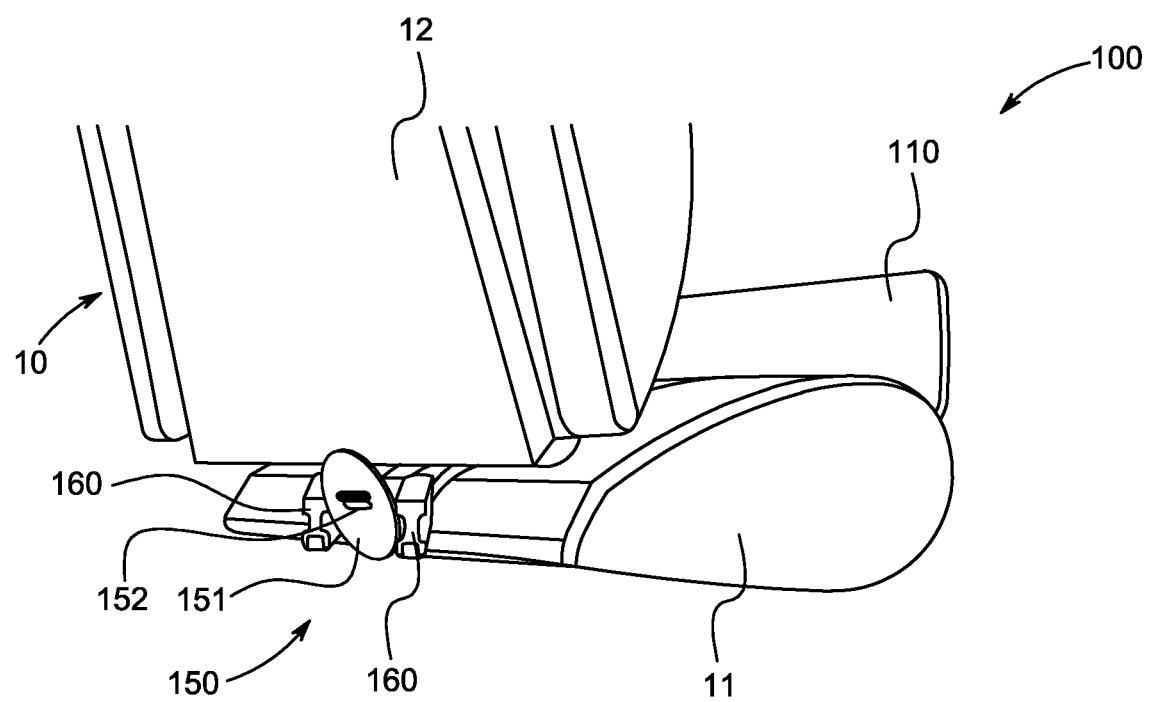
FIG. 6 illustrates an angled rear view of the interior automobile accessory fully installed on the seat, according to an exemplary embodiment of the present general inventive concept.

FIG. 6 illustrates an angled rear view of the interior automobile accessory 100 fully installed on the seat 10, according to an exemplary embodiment of the present general inventive concept.

The adjustable buckle 150 may include a plastic circular piece 151 and a tensioning snap 152, but is not limited thereto.

FIG. 6 is an angled rear view of the interior automobile accessory 100 fully installed on a seat 10. A first fastening device of the plurality of fastening devices 160 may be a simple clip that connects the ends of the left strap of the plurality of straps 140. The plastic circular piece 151 of the adjustable buckle 150 may have the middle strap of the plurality of straps 140 running through it and a tensioning snap 152 to create tension and prevent the anchored base 130 from twisting, tilting, and moving. A second fastening device of the plurality of fastening devices 160 may be a simple clip that connects the ends of the right strap of the plurality of straps 140. All the plurality of straps 140 and the plurality of fastening devices 160 may meet at the base where the seat base 11 and the backrest 12 meet.

The present general inventive concept may include an interior automobile accessory 100, including a removable guard 110 removably connected to a seat 10 of an automobile to prevent items from falling off the seat 10, a plurality of cylinder prongs 120 angularly disposed away from the removable guard 110 with respect to a direction, an anchored base 130 removably connected to the seat 10 to receive the plurality of cylinder prongs 120 therein, and a plurality of straps 140 removably connected to the anchored base 130 and extending from the anchored base 130 a crevice between a seat base 11 and a back rest 12 to fasten the anchored base 130 to the seat 10.

The anchored base 130 may include a plate 131 removably connected to the seat base 11, a plurality of cylinder tubes 132 disposed on at least a portion of the plate 131 to receive the plurality of cylinder prongs 120 therein, and a plurality of designated slots 133 disposed on at least a portion of the plate 131 to receive the plurality of straps 140 therein.

One of the plurality of straps 140 may be fastened to the seat 10 different from at least one second of the plurality of straps 140 is fastened to the seat 10.

The interior automobile accessory 100 may further include an adjustable buckle 150 comprising a plastic circular piece 151 disposed at an end of one of the plurality of straps 140 to create tension and prevent at least one of rotating and tilting of the anchored base 130.

The adjustable buckle 150 may be disposed on a middle strap between a first strap and a second strap of the plurality of straps 140.

The interior automobile accessory 100 may further include a plurality of fastening devices 160 disposed at an end of each of the plurality of straps 140 to fasten the removable guard 110 and the anchored base 130 to the seat 10 by connecting a first end of each of the plurality of straps 140 to a second end of each of the plurality of straps 140.

A first end of each of the plurality of straps 140 disposed on a top side of the seat base 11 may connect to a second end of each of the plurality of straps 140 disposed on a bottom side of the seat base 11.

The interior automobile accessory 100 may further include a waste bin 170 removably connected to the anchored base 130 to replace the removable guard 110.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An interior automobile accessory, comprising:
  a removable guard removably connected to a seat of an automobile to prevent items from falling off the seat;
  a plurality of cylinder prongs angularly disposed away from the removable guard with respect to a direction;
  an anchored base removably connected to the seat to receive the plurality of cylinder prongs therein;
  a plurality of straps removably connected to the anchored base and extending from the anchored base a crevice between a seat base and a back rest to fasten the anchored base to the seat; and
  a waste bin removably connected to the anchored base to replace the removable guard.

2. The interior automobile accessory of claim 1, wherein the anchored base comprises:
  a plate removably connected to the seat base;
  a plurality of cylinder tubes disposed on at least a portion of the plate to receive the plurality of cylinder prongs therein; and
  a plurality of designated slots disposed on at least a portion of the plate to receive the plurality of straps therein.

3. The interior automobile accessory of claim 1, wherein one of the plurality of straps is fastened to the seat different from at least one second of the plurality of straps is fastened to the seat.

4. The interior automobile accessory of claim 1, further comprising:
  an adjustable buckle comprising a plastic circular piece disposed at an end of one of the plurality of straps to create tension and prevent at least one of rotating and tilting of the anchored base.

5. The interior automobile accessory of claim 4, wherein the adjustable buckle is disposed on a middle strap between a first strap and a second strap of the plurality of straps.

6. The interior automobile accessory of claim 1, further comprising:
  a plurality of fastening devices disposed at an end of each of the plurality of straps to fasten the removable guard and the anchored base to the seat by connecting a first end of each of the plurality of straps to a second end of each of the plurality of straps.

7. The interior automobile accessory of claim 1, wherein a first end of each of the plurality of straps disposed on a top side of the seat base connects to a second end of each of the plurality of straps disposed on a bottom side of the seat base.

* * * * *